July 4, 1950          A. Y. DODGE          2,514,228
COUPLING
Filed Jan. 18, 1947
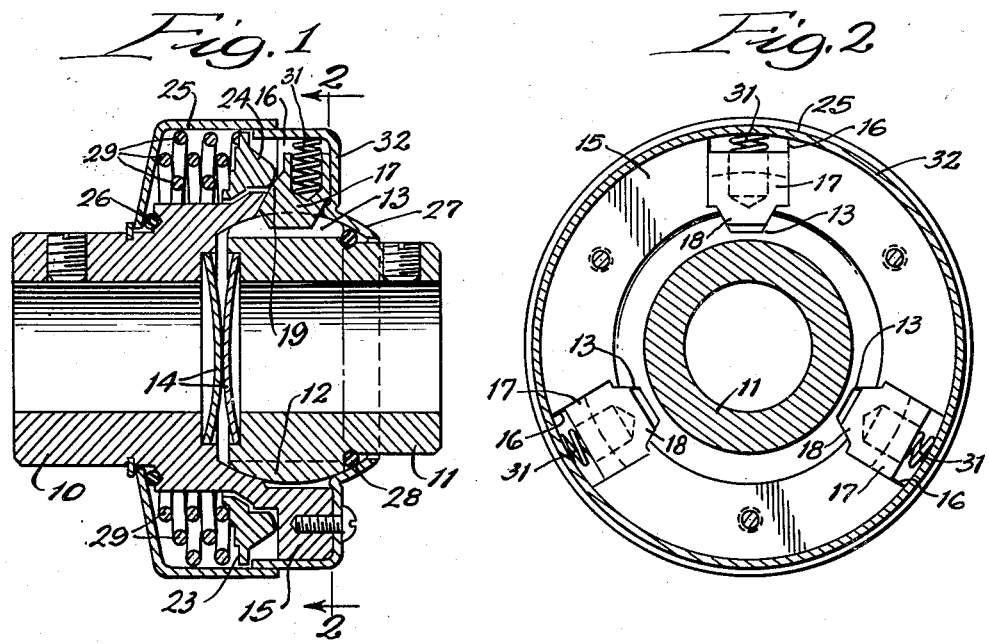
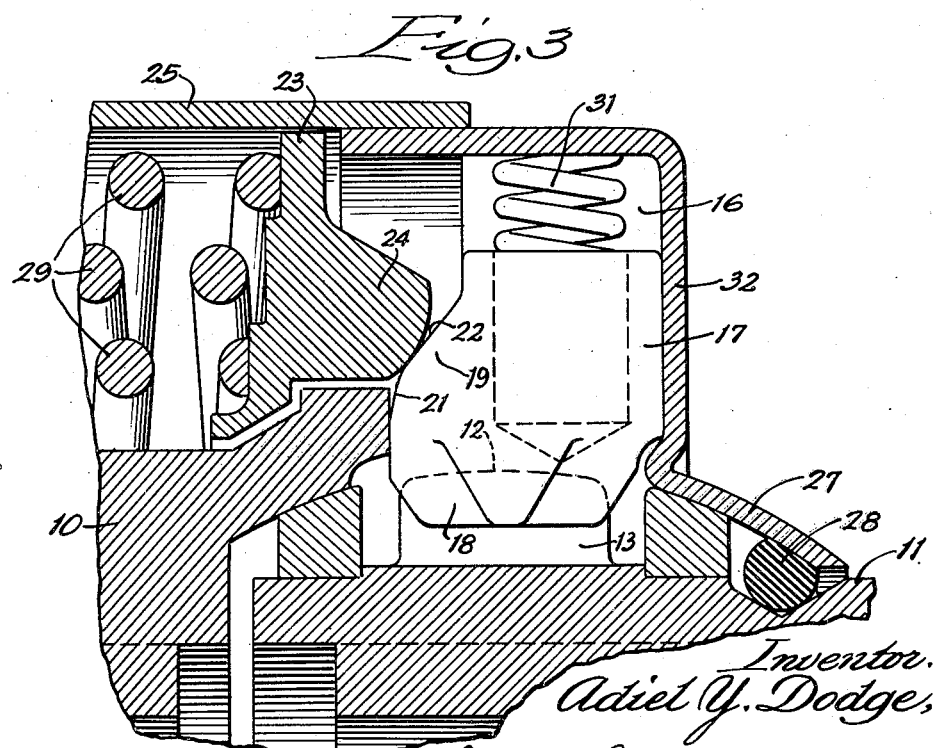

Patented July 4, 1950

2,514,228

UNITED STATES PATENT OFFICE 2,514,228

COUPLING

Adiel Y. Dodge, Rockford, Ill.

Application January 18, 1947, Serial No. 722,835

6 Claims. (Cl. 192—104)

This invention relates to couplings and more particularly to torque transmitting couplings of the type which disengage in response to overloads.

One of the objects of the invention is to provide a coupling whose action is extremely uniform so that engagement and disengagement occur under substantially identical operating conditions in successive operations.

Another object is to provide a coupling which is responsive to both torque and speed and in which the relative effects of torque and speed can be easily altered by design.

Still another object is to provide a coupling in which friction and wear during operation are minimized. According to one feature, all of the relatively moving parts have bearing surfaces of maximum area so that loading is minimized and an oil film can be maintained.

A further object is to provide a coupling which comprises a minimum number of parts all of which are easy to fabricate and assemble.

The above and other objects and advantages of the invention will be more readily apparent from the following description when read in connection with the accompanying drawing, in which—

Figure 1 is an axial section through a coupling embodying the invention;

Figure 2 is a transverse section on the line 2—2 of Fig. 1; and

Figure 3 is an enlarged partial axial section.

The coupling comprises a pair of sleeve members 10 and 11 which are adapted to be connected to coaxial driving and driven shafts. While either of the members may be the driving member, it is preferred that the member 10 should drive particularly when a speed response is desired. The member 11 is formed adjacent its end with an enlarged portion 12 which is axially cut to provide a series of notches or recesses 13 having converging sides. The end of the tubular members 10 and 11 may be closed by plugs 14 so that the coupling will retain lubricant.

The member 10 is formed with a radially extending frame portion 15 which overlies the enlarged portion 12 and which is formed with a plurality of radially extending passages or bores 16. Coupling elements in the form of plungers 17 which are relatively wide circumferentially with respect to their length are slidable in the passages 16. Each of the coupling plungers terminates in a notch portion 18 which is of a size or shape to be received snugly in the recesses 13 to connect the driving and driven members.

In order to urge the coupling plungers into engagement with the recesses, each plunger is formed on one face with a cam projection 19 whose outer surface is convex and is formed by a pair of radially successive cam surfaces 21 and 22. The outer cam surface 22 lies at a smaller angle to the axis of the member 10 than the cam surface 21 so that it will produce a larger camming action, as will be explained hereinafter.

The cam surfaces are adapted to be engaged by a ring 23 which is slidable axially of the member 10 and which is formed with an annular cam projection 24 whose outer end portion is convex in radial section. The cam ring and the plungers are inclosed in a housing 25 carried by the member 10 and sealed against the member 10 by a fixed sealing ring 26. The housing terminates in a partially spherical flange portion 27 which rides against a sealing ring 28 carried by the member 11 so that a limited angular misalignment of the members 10 and 11 can occur.

The housing carries one or more compression springs 29 which fit against the rearward end of the housing and against the ring 23 to urge the ring toward the coupling plungers thereby to press the cam projection on the ring against the cam surfaces of the plungers. The plungers are preferably also urged inward by individual springs 31. It will be noted that the axial pressure on the plungers produced by the springs 29 acting through the ring is absorbed by the radial end portion 32 of the housing 25. This end portion 32 provides a smooth radial surface to guide the plungers radially so that all of the force of the springs 29 is absorbed in the housing itself.

In operation, when the coupling is engaged, the parts will occupy the position shown with the plungers engaging the recesses. At this time, the cam portion of the ring engages the cam surfaces 22 of the plungers to urge the plungers inward with a relatively high mechanical advantage. Due to the tapering sides of the recesses 13 and of the notch portions 18 on the plungers, the torque load tends to cam the plungers outwardly so that when a predetermined torque is reached the plungers will move out and will cam the ring 23 to the left against the springs 29. At this time, the cam surfaces 21 which lie at much flatter angles will engage the cam projection on the ring so that the plungers will be urged inward with a relatively small force. If desired, this angle may be such that it will just balance the friction on the plungers so that the only inward force exerted on the plungers will be that of the springs 31. It will also be noted that the centrifugal force on the plungers tends to hold them out so that by properly proportioning the weights of the plungers and the compression of the springs 31, the speed at which reengagement will occur can accurately be determined.

With the construction shown, all radial force on the plungers acting through the cam surfaces will be absorbed directly by the ring 23 so that the housing can be made relatively light. The only radial force ever required to be absorbed by the housing is that of the springs 31 which can be a relatively light force. This feature also minimizes friction on the plungers since the only points subjected to any appreciable friction are the sides of the plungers and the cam surfaces. All of these surfaces may provide relatively large contact areas, the contact between the cam projection 24 and the cam surfaces extending throughout the full width of the plungers so that an oil film can easily be maintained. The friction effect, therefore, becomes substantially constant and wear is minimized so that the coupling will disengage and engage under extremely uniform operating conditions during successive operations.

While one embodiment of the invention has been shown and described in detail, it will be understood that it is illustrative only and is not intended to be a definition of the scope of the invention, reference being had for this purpose to the appended claims.

What is claimed is:

1. A coupling comprising rotatable driving and driven members, means on one of the members forming an outwardly facing series of recesses, coupling elements movably carried by the other member for radial movement into engagement with the recesses, the coupling elements being formed on one side with inner and outer cam surfaces lying at different angles to the axis of said other member, a ring slidable axially of said other member and formed with a convex cam projection engageable with the cam surfaces to urge the coupling elements toward the recesses with different degrees of force in different radial positions thereof, said other member being formed with a straight radial guide surface engaging the other sides of the coupling elements, and a spring urging the ring toward the coupling elements.

2. A coupling comprising rotatable driving and driven members, means on one of the members forming an outwardly facing series of recesses, coupling elements movably carried by the other member for radial movement into engagement with the recesses, the coupling elements being formed on one side with inner and outer cam surfaces lying at different angles to the axis of said other member, a ring slidable axially of said other member and formed with a convex cam projection engageable with the cam surfaces to urge the coupling elements toward the recesses with different degrees of force in different radial positions thereof, a spring urging the ring toward the coupling elements, and a spring means carried by said other member urging the coupling elements radially inward thereon.

3. A coupling comprising rotatable driving and driven members, means on one of the members forming a series of outwardly facing recesses, a series of plungers movable radially on the other member into engagement with the recesses and being of substantial circumferential width relative to their length, a cam projection on one side of each plunger extending arcuately throughout the width of the plunger and having radially successive cam surfaces lying at different angles to the axis of said other member, a ring slidable axially of said other member and having an annular cam projection thereon which is convex in radial section to engage the cam projections on the plungers, and a spring urging the ring toward the plungers.

4. A coupling comprising rotatable driving and driven members, means on one of the members forming a series of outwardly facing recesses, a series of plungers movable radially on the other member into engagement with the recesses and being of substantial circumferential width relative to their length, a cam projection on one side of each plunger extending arcuately throughout the width of the plunger and having radially successive cam surfaces lying at different angles to the axis of said other member, a ring slidable axially of said other member and having an annular cam projection thereon which is convex in radial section to engage the cam projections on the plungers, individual springs urging the plungers radially inward toward the recesses, and a spring urging the ring axially toward the plungers.

5. A coupling comprising rotatable driving and driven members, means on one of the members forming a series of outwardly facing recesses, a flange portion on the other member formed with radially extending passages to register with the recesses, coupling elements slidable in the passages for radial movement into and out of engagement with the recesses, the coupling elements being formed with convex cam projections at one side providing radially successive cam surfaces at different angles to the axis of said other member, a ring slidable axially on said other member and having an annular cam projection thereon which is convex in radial section to engage the cam projections on the coupling elements, a housing on the other member inclosing the flange, the coupling elements and the ring, and a spring in the housing urging the ring toward the coupling elements, the housing having a radial surface engaging the coupling elements opposite the cam ring to guide them for radial movement.

6. A coupling comprising rotatable driving and driven members, means on one of the members forming a series of outwardly facing recesses, a flange portion on the other member formed with radially extending passages to register with the recesses, coupling elements slidable in the passages for radial movement into and out of engagement with the recesses, the coupling elements being formed with convex cam projections at one side providing radially successive cam surfaces at different angles to the axis of said other member, a ring slidable axially on said other member and having an annular cam projection thereon which is convex in radial section to engage the cam projections on the coupling elements, a housing on the other member inclosing the flange, the coupling elements and the ring, individual springs in the housing urging the coupling elements radially inward, and a spring in the housing urging the ring axially toward the coupling elements.

ADIEL Y. DODGE.

REFERENCES CITED

The following references are of record in the file of this patent:

UNITED STATES PATENTS

| Number | Name | Date |
| --- | --- | --- |
| 1,805,692 | Ferenci | May 19, 1931 |
| 1,883,164 | Vassakos | Oct. 18, 1932 |
| 2,238,583 | Dodge | Apr. 15, 1941 |
| 2,412,630 | Nelson | Dec. 17, 1946 |
| 2,429,091 | Dodge et al. | Oct. 14, 1947 |